(12) United States Patent
Unbehaun

(10) Patent No.: US 8,391,261 B2
(45) Date of Patent: Mar. 5, 2013

(54) METHOD FOR GENERATION OF BEACONS BY A BASE STATION IN A WIRELESS COMMUNICATIONS NETWORK

(75) Inventor: Joerg Unbehaun, Dresden (DE)

(73) Assignee: NXP B.V., Eindhoven (NL)

( * ) Notice: Subject to any disclaimer, the term of this patent is extended or adjusted under 35 U.S.C. 154(b) by 328 days.

(21) Appl. No.: 12/808,185

(22) PCT Filed: Oct. 22, 2008

(86) PCT No.: PCT/IB2008/054349
§ 371 (c)(1),
(2), (4) Date: Jun. 15, 2010

(87) PCT Pub. No.: WO2009/077893
PCT Pub. Date: Jun. 25, 2009

(65) Prior Publication Data
US 2010/0296501 A1    Nov. 25, 2010

(30) Foreign Application Priority Data
Dec. 17, 2007    (EP) ..................................... 07024453

(51) Int. Cl.
*H04W 4/00* (2009.01)
(52) U.S. Cl. ....................................................... 370/338
(58) Field of Classification Search ................... 370/311, 370/328–339, 347–350
See application file for complete search history.

(56) References Cited

U.S. PATENT DOCUMENTS 7,486,753 B2 *    2/2009    Ichikawa ...................... 375/354
2004/0253996 A1    12/2004    Chen et al.
2005/0036473 A1 *    2/2005    Lee et al. ...................... 370/345
2007/0021093 A1    1/2007    Chu

FOREIGN PATENT DOCUMENTS

| | | |
|---|---|---|
| DE | 10 2005 051291 A1 | 5/2007 |
| EP | 1 463 242 A2 | 9/2004 |
| EP | 1 653 667 A1 | 5/2006 |
| EP | 1 684 466 A1 | 7/2006 |
| WO | 03/075586 A1 | 9/2003 |
| WO | 2004/075583 A1 | 9/2004 |
| WO | 2005/094103 A1 | 10/2005 |

OTHER PUBLICATIONS

International Search Report for Int'l. Patent Appln. No. PCT/IB2008/054349 (Apr. 16, 2009).

* cited by examiner

*Primary Examiner* — Frank Duong

(57) ABSTRACT

The invention, which relates to a method for the generation of beacons by a base station in a wireless communications network, consisting of at least one base station and at least one station, the beacons being generated repeatedly at time intervals, is based on the object of specifying a method with which the generation of the beacons can be tailored to needs, achieving a reduction of the energy demand and the emissions, and an improvement in the security. According to the invention, the object is achieved in that the generation of the beacons is started with a switching on of the base station and is ended after the expiry of a wait time $t_{w0}$ in the event that no station is connected to the base station, and in that the generation of the beacons is started by a receipt of a probe request from a station of the communications network and is ended after the expiry of a wait time $t_{w1}$ in the event that no station is connected to the base station.

2 Claims, No Drawings

METHOD FOR GENERATION OF BEACONS BY A BASE STATION IN A WIRELESS COMMUNICATIONS NETWORK

The invention relates to a method for generation of beacons by a base station in a wireless communications network, consisting of at least one base station and at least one station, the beacons being generated repeatedly at time intervals.

Wireless networks (WLAN . . . Wireless Local Area Network) work for example according to the standard IEEE 802.11 and can be operated in the operation modes "Ad-hoc mode" or "Infrastructure mode".

In the ad-hoc mode, no central instance is used; the stations (clients) belonging to the network work equivalently. Communication of the stations with one another is only possible if all stations use the same network name (SSID . . . Service Set Identifier) and the same settings for the encryption. The disadvantages of this operation mode are that a station cannot tell whether it is in the transmission range of another station with the same settings; who is part of the network; and what the quality of the connection is.

In the operation mode "Infrastructure mode", a base station (AP . . . Access Point) is provided as a central instance. The coordination within the network is implemented with this. The base station sends special management packets at fixed intervals to all stations in its range of reception. These data packets are also referred to as "beacons", and contain information specific to the base station such as the network name SSID, the type of encryption and the supported data rates. The transmission interval is also called the beacon interval, and in customary base station configurations amounts to 100 ms (corresponding to a transmission of 10 beacons per second).

The beacons support the connection setup in the network, as the clients can thereby recognize an available base station and only need to know the network name and optionally some parameters for the encryption. A further advantage is that the constant sending of the beacons, which are always sent at the lowest transmission rate (e.g. 1 Mbit/sec), enables monitoring of the received signal quality, even in the event that no user data is sent or received.

Since the beacons are sent at time intervals of, for example, 100 ms, i.e. 10 times per second, this is 36000 beacons per hour and 144000 per day. Especially in the area of home applications, in which the network is used only for a few hours a day, the sending of the beacons represents an unnecessary energy demand and an avoidable source of faults. Furthermore, the transmission of the beacons makes the network visible to unwanted users, so that it becomes susceptible to attack.

Since the beacons are only necessary for setting up and maintaining a connection, the generation itself is unnecessary in the remaining time.

For the setup of a connection between a station belonging to the network and the base station, the connection options are determined by the station with a scanning or sampling process. A distinction is made here between passive and active scanning.

In passive scanning the station successively selects all possible channels, and for each channel, checks for the length of a wait time whether a beacon is received. This wait time is sized in such a way according to the transmission interval of the beacons that a beacon can certainly be received.

In active scanning, the station sends a probe request successively to all possible channels, and waits for a probe response from an available base station. The response sent by the base station is very similar to the transmitted beacon. Since the base station sends an immediate response to the station's request in active scanning, the complete scanning process can be executed faster than in passive scanning Base stations which support active scanning react to the probe request packets independently of the beacon transmission.

From prior art, a method for adapting the beacon interval to the current data traffic in a network is known for example from the EP 1 653 667 A1. The beacons are then generated, admittedly at differing intervals, but still permanently.

Furthermore, many WLAN base stations offer in their setting options the possibility of time-controlled switching on and off of the station, and hence also of the beacons; the beacon generation is then controllable only according to a fixed setting, and not geared to demand.

The invention is therefore based on the object of specifying a method with which the generation of the beacons can be tailored to needs, achieving a reduction of the energy demand and the emissions, and an improvement in the security.

According to the invention, the object is achieved with a method for generation of beacons by a base station in a wireless communications network of the kind initially mentioned, in that the generation of the beacons is started with a switching on of the base station and is ended after the expiry of a wait time $t_{w0}$ in the event that no station is connected to the base station, and in that the generation of the beacons is started by a receipt of a probe request from a station of the communications network and is ended after the expiry of a wait time $t_{w1}$ in the event that no station is connected to the base station.

After activation, a base station disposed in a wireless communications network generates beacons at intervals of 100 ms, for example. These beacons can be received by a station disposed in the radio range of the base station. By means of the information contained in each beacon, it is possible for the station to set up a connection between it and the base station. If at least one connection is established between a station and the base station, the beacons will still be continuously generated. In the event that no station is connected to the base station, the generation of the beacons is ended according to the invention after the expiry of a wait time $t_{w0}$. This wait time $t_{w0}$ should be chosen such that a station which has interrupted the connection to the base station because of a fault, for example, is able to establish a renewed connection to the base station. If it can be assumed with certainty after the wait time $t_{w0}$ has expired that there is no active connection between a station and the base station, and there is also no temporary connection interruption, the generation of the beacons is ended by the base station.

If a request is sent by a station to a base station in the active scanning method, and received by the base station, the process of generation of beacons by the base station starts once again. A response to the station's request is sent from the base station, and likewise contains information for the setup of a connection between the station and the base station. The station can thus set up a connection to the base station, and a data transmission can be started in both directions. So long as at least one active connection exists between a station and the base station, the process of generating beacons is maintained. The generating of the beacons is only ended by the base station after the expiry of the wait time $t_{w1}$, which is started at the moment when the last connection to the base station was ended. In this case too, it is ensured by the corresponding sizing of the wait time $t_{w1}$ that a temporary interruption of the connection between a station and the base station does not lead to the termination of the generation of beacons.

In one development of the invention it is provided that the wait times $t_{w0}$ and $t_{w1}$ are the same.

According to the invention, it is ensured by the wait times $t_{w0}$ and $t_{w1}$ that a temporary interruption of the connection between a station and the base station does not lead to the cessation of the beacon transmissions. The station thus has the possibility of setting up the connection again after a temporary interruption, with the assistance of the information contained in the beacon. According to the invention, the two wait times can have the same or different values.

In a further development of the invention, it is provided that the generation of the beacons is only started by a receipt of a probe request from a station in the communications network if the request is from a known station, identifiable by a MAC address of the station.

An improvement of the security in the network can be achieved if the base station is told which stations are permitted to set up a connection with the base station. For this purpose, the MAC addresses of the devices permitted to set up connections are stored in the base station. If a station sends a probe request, the base station can check by means of the MAC address included in the request, whether the station is a known station approved for communication. Only in the case of a positive check does the base station generate a response to the request, and start generating beacons.

The invention will now be explained in detail on the basis of an example.

A base station B is disposed in a wireless communications network. In the transmission range of the base station B are two mobile stations M1 and M2 ; the mobile stations M1 and M2 can be formed by a laptop, a PDA or a mobile phone with WLAN function, for example. After the base station is switched on, it generates beacons at intervals of 100 ms, these beacons containing information about the network name (SSID) and the supported data transfer rates. The stations M1 and M2 receive these beacons, and read the information they contain. Based on the information they have read, the stations M1 and M2 each establish a connection with the base station according to the standard IEEE 802.11. Data can then be bidirectionally transmitted in the usual way. At a later time, the station M1 terminates its connection to the base station and logs off. The connection to the station M2 is still maintained. During this time, the beacons are continuously generated by the base station. Because of disturbances, from an adjacent wireless communications network for example, there is an interruption of the connection between the station M2 and the base station. At the moment when the last station—in this case station M2—has interrupted the connection to the base station, the wait time $t_{w1}$ begins to run down, its expiry causing the termination of the generation of beacons by the base station. It is necessary for the generation of beacons to continue even while the wait time $t_{w1}$ runs down because, as described in the example, a purely temporary interruption of the connection can be the cause of the connection release between a station and the base station. The transmission of the beacons gives the station M2 another opportunity to establish a connection to the base station. After the station M2 is connected again to the base station, it resumes the data transmission to the base station or the receipt of data from the base station. After termination, the station M2 logs off from the base station. From this time, the wait time $t_{w1}$ begins to run down once more. Once this time has expired, the base station ceases to generate beacons. The wait time $t_{w1}$ should therefore be sized such that a temporary connection break by a station M1 or M2 does not lead to a cessation of the beacon transmission by the base station, rather that the opportunity of a renewed connection by the station M1 or M2 to the base station is offered.

If the generation of beacons is ended by the base station, this consumes less energy, causes fewer emissions, and an improvement of the security in the network is achieved in that stations which are in reception range of the base station can no longer recognize the presence of the base station in passive scanning mode.

If there is subsequently the need to establish a connection between the station M1 and the base station, the station M1 must send a request to the base station in the active scanning operation mode. When the base station receives this request, a response to the request is generated and sent, and at the same time the generation of beacons is started. It is thus possible to set up a connection between station M1 and the base station.

To increase the security in the network, the base station can be told which stations belong to its own communications network and are thus authorized to set up a connection. For this, the MAC addresses of the authorized stations are stored in the base station. If a request from a station is received by the base station, it can be checked by means of the MAC address held in the request, whether the station in question is authorized for connection setup. Thus only in the event that the station is an authorized station is the generation of beacons started and a response sent. Otherwise the base station does not react to the receipt of the request.

The wait time $t_{w0}$, which is started when the base station is switched on, and after whose expiry the generation of beacons is ended if no station has set up a connection to the base station, can have a value differing from that of the wait time $t_{w1}$.

By means of this e.g. much longer wait time $t_{w0}$, it is ensured that after a base station and a laptop are switched on in a home network, the base station will certainly be found for the first time after a sometimes time-consuming start-up of the laptop, even in the passive scanning operation mode usually selected according to the standard IEEE 802.11.

The invention claimed is:

1. Method for generation of beacons by a base station in a wireless communications network, consisting of at least one base station and at least one station, the beacons being repeatedly generated at time intervals, the method comprising:
   starting the generation of the beacons with a switching on of the base station and ending the generation of the beacons after the expiry of a wait time $t_{w0}$ in the event that no station is connected to the base station;
   starting the generation of the beacons by a receipt of a probe request from a station of the communications network and ending the generation of the beacons after the expiry of a wait time $t_{w1}$ in the event that no station is connected to the base station, wherein the wait time $t_{w0}$ and $t_{w1}$ are different; and
   setting the wait time $t_{w0}$ and $t_{w1}$ such that a temporary interruption of the connection between a station and the base station does not lead to the cessation of the generation of the beacons.

2. Method according claim 1, characterized in that starting the generation of the beacons by the receipt of the probe request includes only starting the generation of the beacons by the receipt of the probe request from the station in the communications network if the probe request is from a known station, identifiable by a MAC address of the station.

* * * * *